United States Patent [19]

Diekmann et al.

[11] Patent Number: 4,568,508
[45] Date of Patent: Feb. 4, 1986

[54] CUT-OFF PROCESS FOR TERMINATING INJECTION OPERATIONS OF AN INJECTION MOLDING MACHINE

[75] Inventors: Herbert Diekmann, Morsum; Hermann Roseland, Langwedel, both of Fed. Rep. of Germany

[73] Assignee: Klockner-Werke Aktiengesellschaft, Duisburg, Fed. Rep. of Germany

[21] Appl. No.: 518,631

[22] Filed: Jul. 29, 1983

[30] Foreign Application Priority Data

Sep. 17, 1982 [DE] Fed. Rep. of Germany ....... 3234523

[51] Int. Cl.⁴ .............................................. B29C 45/16
[52] U.S. Cl. ................... 264/328.8; 425/147; 425/563
[58] Field of Search ............... 264/40.1, 40.4, 40.5, 264/328.8, 308; 425/135, 136, 560, 147, 137, 139, 562, 149, 563, 146

[56] References Cited

U.S. PATENT DOCUMENTS

| | | | |
|---|---|---|---|
| 3,025,568 | 3/1962 | Hardy | 425/563 |
| 3,807,914 | 4/1974 | Paulson et al. | 425/149 |
| 3,840,312 | 10/1974 | Paulson et al. | 425/139 |

FOREIGN PATENT DOCUMENTS

| | | | |
|---|---|---|---|
| 2360474 | 7/1974 | Fed. Rep. of Germany | 425/137 |
| 51-6256 | 1/1976 | Japan | 425/149 |

OTHER PUBLICATIONS

DESMA Catalog, Rotary Injection Moulding Machines for the Direct Soling of Thermoplastics Soles to Uppers, published on May 1981.

*Primary Examiner*—Jay H. Woo
*Assistant Examiner*—Joye L. Woodard
*Attorney, Agent, or Firm*—Watson, Cole, Grindle & Watson

[57] ABSTRACT

A cut-off process for an injection molding machine for forming two-layer, directly laminated footwear soles and includes a pressure transmission pin which is guided in a passageway constructed as a through-hole between the mold cavity and the outer surface of the mold. The pressure transmission pin is preloaded by a spring in the direction of the mold cavity so that it can be depressed or actuated under injection pressure. When the injection pressure is relieved and the molded piece shrinks, the pressure transmission pin will be moved back by the spring to its initial position, thereby releasing a switch for a new switching operation for the next, second, injecting operation.

1 Claim, 4 Drawing Figures

CUT-OFF PROCESS FOR TERMINATING INJECTION OPERATIONS OF AN INJECTION MOLDING MACHINE

BACKGROUND OF THE INVENTION

1. Field of the Invention

This invention relates to a cut-off device for cutting off injection operations of an injection molding machine which forms two-layer molded pieces such as footwear soles. A process for terminating a first and a second injecting operation in such an injection molding machine is also disclosed.

2. Decription of the Prior Art

Devices such as, for example, DESMA Rotary Table Models 723 and 724 are known for producing two-layer directly formed soles by using a first injecting operation for forming an outsole layer and by using a subsequent second injecting operation for forming an intermediate sole layer, sometimes with a toe cap. To cut off or terminate the injection of material such as thermoplastic material into a mold cavity, two individual cut-off devices working independently of one another have been utilized. The first cut-off device for the first injecting operation includes a pressure transmission pin which acts on a switching element such as a microswitch. The inner terminal area of such prior art pressure transmission pin is placed directly in a mold cavity for the first injecting operation and is moved outwardly by the injection pressure to actuate a switch element housed in the injection mold, namely in the sole tip area beneath the mold cavity. When changing the mold, the switching element is changed automatically.

The second prior art cut-off device for the second injecting operation is placed on a machine column. It is not in direct connection with the injection mold in which another or second pressure transmission pin is arranged which reaches into the mold cavity for the second injecting operation. The second switch element must be coupled to the outer terminal area of this second pressure transmission pin by adjusting a telescopic tube. Such prior art cut-off system includes two individual cut-off devices which exhibit drawbacks during mold changes because an adjustment of the transmission components for the second switch element is necessary. Moreover, for each mold change the first switch element must be electrically connected.

SUMMARY OF THE INVENTION

The object of the invention is to avoid the drawbacks noted above and to improve prior art cut-off devices and known cut-off methods so that during the changing of molds between molding operations no further manipulations are necessary for the adjustment of the switching elements. This object is achieved by the provision of a spring biased transmission pin adapted to return to a predetermined operating position upon shrinkage of the molded piece within the mold.

According to the invention, only a single cut-off device is used. This can be considered as an improvement over the known, first single cut-off device. The invention includes a spring which heretofore has only been used to reset the microswitch. The spring is strengthened such that upon completion of the first injecting operation, that is, when the injection pressure is relieved and the molded piece of the first injecting operation shrinks, the spring presses the pressure transmission pin back to its initial position, thereby releasing the switch element, that is to say, making the switch element available for a second switching operation. The second switching operation is tripped by transmitting the injection pressure prevailing in the mold cavity via the first molded piece to the pressure transmission pin. The pressure transmission pin again actuates the switch element which is preferably constructed as a contactless approximation switch.

An important concept of the invention lies in the indirect sensing of the injection pressure in the second mold cavity, that is, in the mold cavity for the intermediate sole. The injection pressure is no longer sensed directly, but is transmitted indirectly via the first molded piece to the pressure transmission pin. Thus, unlike the prior art cut-off devices, this invention obviates the need for a second pressure transmission pin, a second switching element and the additional associated devices.

The direct pressure transmission to the single pressure transmission pin via the first molded piece was found to be sufficient to obtain a reliable cut-off signal for the second injecting operation. This was not at all obvious because heretofore the mold cavity pressure was always sensed directly by a special pressure transmission pin for each molding operation disposed in the particular mold cavity. In contrast, only a single pressure transmission pin is used for each molding operation in the present invention.

The direct transmission of the injection pressure from a second molding operation via the first molded piece to the single pressure transmission pin only trips the cut-off operation of the second injection molding operation if a single switch element of the cut-off device is reactivated, that is to say, reset after the first injecting operation has been cut-off. This reset is effected by a resetting spring which acts either directly on the pressure transmission pin or acts on a part which, in turn, bears against the pressure transmission pin or is forced into abutting engagement when a mold is inserted in the injection molding machine.

A further improvement includes maintaining an elongated transmission plate in a bearing relation with an outer terminal area of the pressure transmission pin. The transmission plate is located outside the mold and is loaded by the spring in the direction of the pressure transmission pin so that when a mold is inserted into the injection molding machine the transmission plate bears against the outer terminal area of the pressure transmission pin. At least one switching element such as a contactless approximation switch is placed on an outer surface of the transmission plate facing away from the pressure transmission pin. This transmission plate transmits the pressure of the pressure transmission pin to a large surface. That is, the special positioning of the pressure transmission pin within molds of varying sizes is no longer essential, since the transmission plate can be constructed in such a way that it can always be made to bear its upper surface against the transmission pin in all positions of the outer terminal area of the pressure transmission pin.

At least one switching element which functions in response to a sufficient movement of the transmission plate is operatively associated therewith. Thus, when changing molds, particularly when changing over to relatively large or relatively small molds, a reliable transmission of the cut-off force to the switch element is ensured. That is, the transmission plate can be dimensioned greater than the distance over which the transmission pin may vary due to its varying position within different mold sizes. A reference point such as a shoe tip portion of the mold may be used to determine the largest and smallest mold sizes and the corresponding distance over which the transmission pin may vary. As in the case of prior art injection molding machines, the mold cavity can be positioned within the mold so that the shaft is always located at the same site.

Instead of the transmission plate, one can also use a switching element with a correspondingly large sensor surface which is identical to the necessary surface of the transmission plate so that, independently of the position of the pressure transmission pin, the switching element can function in response to different molds.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENTS

Figure 2:
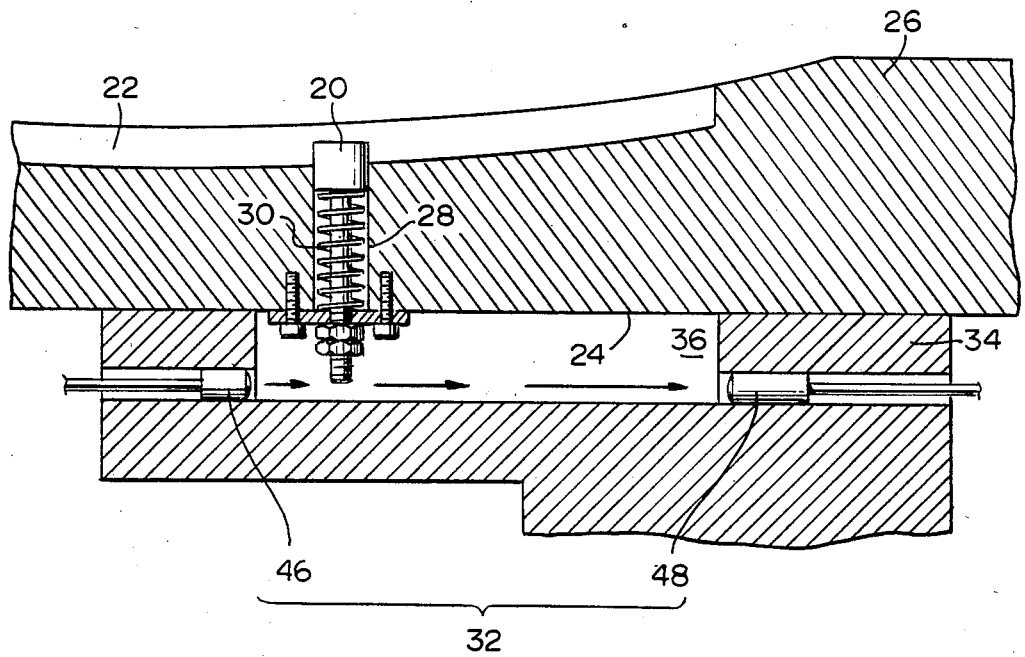
FIG. 2 is a section through a cut-off device having a pressure transmission pin, a spring and an optical switching arrangement.

The cut-off device shown in the Figures is directed to two-layer molded pieces in the form of two-layer directly laminated composite soles. As shown in FIG. 2, the device has one, and not more than one, pressure transmission pin 20 which is closely guided in a passageway 28 which is open to the mold cavity 22 and to the outer surface 24 of the mold 26. Transmission pin 20 is preloaded by a spring 30 in the direction of the mold cavity 22. A switching element 32 is assigned to a terminal area of pin 20 and may extend toward the outer surface 24 of mold cavity 22.

According to the invention, the spring 30 preloading the pressure transmission pin 20 is so designed and dimensioned that upon completion of an injecting operation when the injection pressure is relieved and the molded piece shrinks, spring 30 presses the pressure transmission pin 20 back to its initial position as shown in FIG. 2. This is also the position which pin 20 assumes prior to an injecting operation. The mold cavity 22 into which the pressure transmission pin 20 extends as shown in FIG. 2, is the mold cavity for the first injecting operation. The mold cavity for the second injecting operation (not shown) is located thereabove. During the injecting operation, the pressure transmission pin 20 is pressed back against the action of its spring 30 until it closes flush with the surface of the mold cavity 22.

Figure 1:
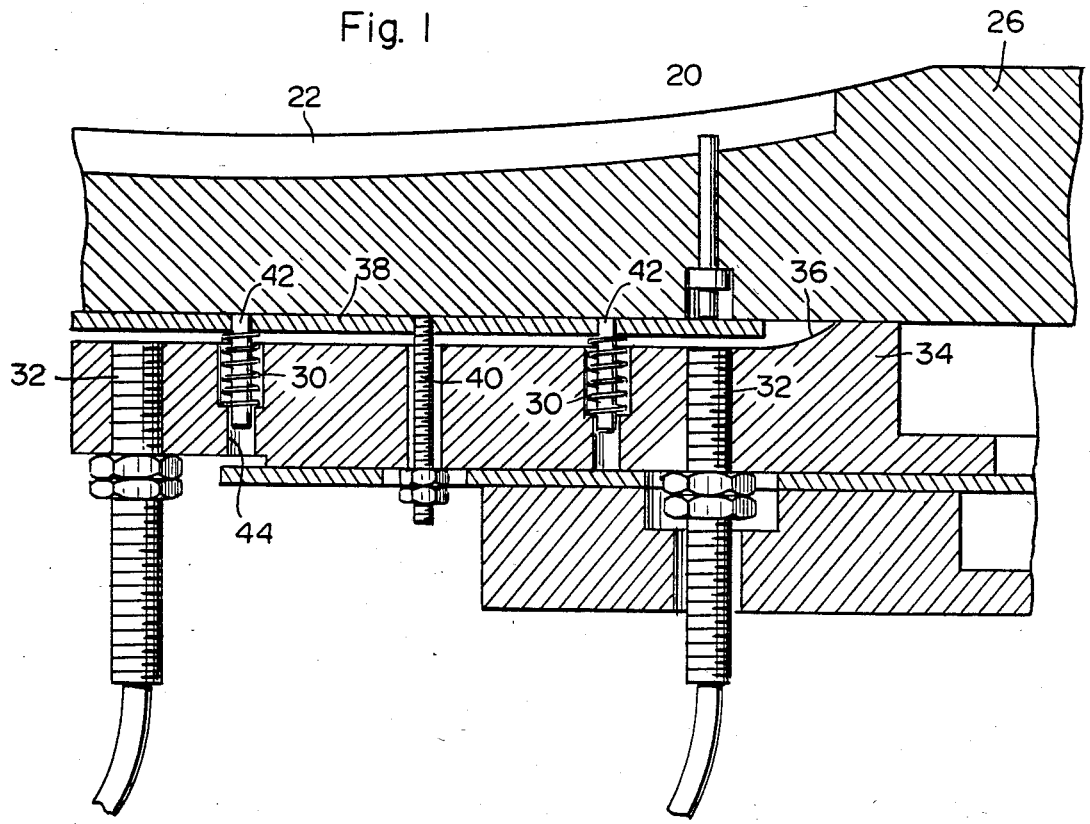
FIG. 1 is a wiring diagram of a spring biased transmission plate and associated switching elements of a cut-off device with an enlarged switching surface.

Another cut-off device shown in FIG. 1 is arranged in a tempering plate 34 having a longitudinal groove 36 formed therein into which a transmission plate 38, which may be dimensioned 12 mm wide and 105 mm long, is movably fitted. A threaded bolt 40 is axially fastened thereto and is connected to the tempering plate 34 in such a way that the transmission plate 38 has a certain vertical play and can also tip sideways in the manner of a rocker. Two pins 42 are symmetrically arranged on transmission plate 38 on either side of the threaded bolt 40 and dip into the bores 44 of the tempering plate 34. Each of the two bores 44 is provided with a single spring 31 to press the transmission plate 38 outwardly. The spring pressure can be adjusted by the threaded bolts 40. There is further arranged in the tempering plate 34 switching element 32 including two contactless approximation switches whose end faces are spaced a distance of approximately one millimeter from the underside of the transmission plate 38 when plate 34 is not actuated.

When pressure transmission pin 20 presses any point of the transmission plate 38 under the effect of the injection pressure, the transmission plate 38 moves downwards. This reduces the gap between plate 38 and at least one switching element 32 thereby tripping it. Upon cooling and shrinking of the molded piece, the two single springs 31, which act like spring 30, press the transmission plate 38 and thereby move the pressure transmission pin 20 upwards again.

In the embodiment shown in FIG. 2, the cut-off device is arranged in the tempering plate 34. A longitudinal groove 36 is cut therein from a top surface to a depth greater than that shown in FIG. 1. The bottom surface of groove 36 formed in plate 34 functions as a stop for the pressure transmission pin 20 in its sunk or depressed position. In the initial position of the pressure transmission pin 20 shown in FIG. 2, pin 20 is spaced a certain distance from the bottom of the longitudinal groove 36. In this way, an uninterrupted beam of light located between a light source 46 and a light sensor 48 passes therebetween. The optical setup consisting of light source 46 and light sensor 48 forms the switching element 32. As soon as the terminal area of the pressure transmission pin 20 pointing to the outside of mold 26 is pressed downwards, the beam of light is interrupted, the light sensor 48 receives no more light and, hence, cannot actuate a succeeding circuit breaker.

Other constructions of the switching elements 32 are possible to obtain a cut-off signal which is independent of any special positioning of the pressure transmission pin 20. For example, a series of microswitches can be placed in longitudinal groove 36, with the distance between the actuating mechanisms of two individual microswitches being smaller than the corresponding dimension on the pressure transmission pin 20. Moreover, instead of using the light barrier in the bottom of the longitudinal groove 36 shown in FIG. 2, several contactless approximation switches can be placed one behind the other, or an elongated switching element can be used. Finally, it should not be ruled out that the terminal area of the pressure transmission pin 20 pointing to the outside of the mold cavity 22 is made relatively wide so that, regardless of the particular size of the mold, it can always strike a switching element having a relatively small actuating mechanism.

Figure 3:
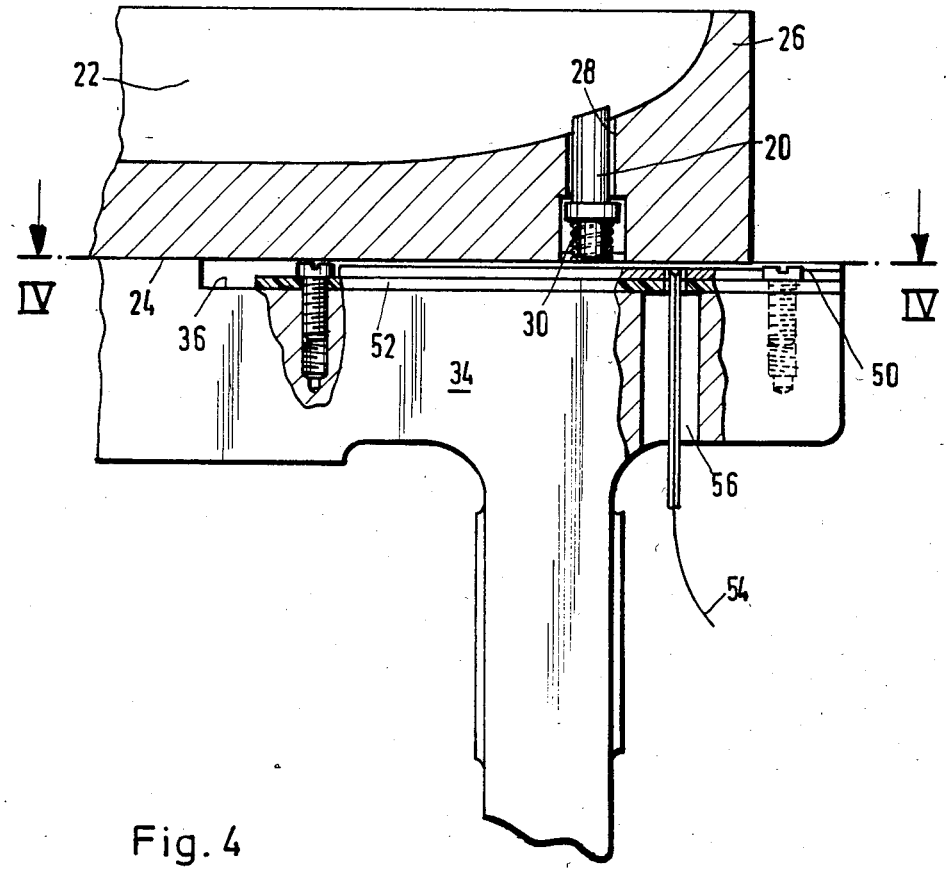
FIG. 3 is a section through a cut-off device having a pressure transmission pin, a spring and a cut-off device, wherein the pressure transmission pin forms an electrical contact of the cut-off device.
Figure 4:
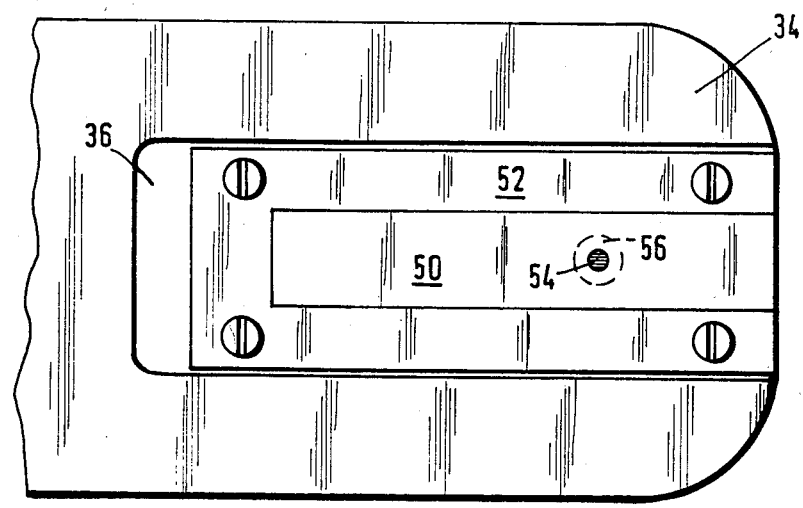
FIG. 4 is a cross-sectional view taken along the line IV—IV OF FIG. 3.

In the embodiment shown in FIGS. 3 and 4, the switching element 32 includes the underside of the pressure transmission pin 20 and a contact plate 50. The metal pressure transmission pin 20 is in constant electrical contact with the mold 26 because it touches the latter or is otherwise electrically connected thereto.

The pressure transmission pin 20 and, hence, the mold 26 form a contact of an electric switch whose second contact is the stationary contact plate 50. The latter is affixed to the tempering plate 34 without any electrical contact therewith. To this end, there is inserted between contact plate 50 and tempering plate 34 an insulating plate 52 which is longer and wider than contact plate 50 as shown in FIG. 4. As further shown in FIG. 3, contact plate 50 is connected with an electric feed line 34 which is guided through a bore 56 of the tempering plate 34 without any contact therewith.

As soon as the pressure transmission pin 20 is pressed downward against the action of spring 30, starting from the position shown in FIG. 3 in which it has no electrical contact with contact plate 50, an electrical connection is established between the mold 26 and the feed line 59. This electrical switching operation is utilized for generating the cut-off signal to terminate the injection operation.

The geometrical dimensions of the device are selected such that whenever the upper side of pin 20 closes flush with the mold 26, that is, when the pressure transmission pin 20 is depressed, contact is established between the underside of pin 20 and the metal contact plate 50. As in the embodiments discussed hereinabove, a longitudinal groove 36 is cut in the tempering plate 34 in which the contact plate 50 and the insulating plate 52 are housed. The upper surface of the contact plate 50 is located beneath the level of the upper surface of the tempering plate 34, so that a small insulating air gap remains between the contact plate 50 and the outer surface 24. This prevents the mold 26 from coming into contact with the contact plate 50.

The insulating plate 52 is rigidly connected to the tempering plate 34 by four screws. Contact plate 50, which is glued onto the insulating plate 52, lies within the surface defined by the four screws. Other retaining devices such as rivets can also be used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cut-off process for an injection molding machine molding an overlying double layer directly laminated mold piece under pressure within a mold having a mold cavity, said mold cavity having a first mold wall for a first injection mass injected into said cavity, said first mass defining a second mold wall for a second injection mass injected into said cavity over said first mass, and a passageway formed between said first mold wall and an outer surface portion of said mold, comprising in combination:

disposing a pressure transmission pin, having a head, in said passageway for movement inwardly toward and outwardly away from said cavity respectively between first and second positions;
initially extending said head inwardly of said first mold wall in said first position prior to injection of said first mass;
spring biasing said pin into said first position;
moving said pin into said second position in response to injection pressure of said first injection mass;
again extending said head inwardly of said first mold wall by spring biasing said pin back into said first position upon a reduction of said injection pressure due to the shrinkage of said first injection mass;
again moving said pin into said second position in response to injection pressure of said second injection mass as transferred through said first mass; and
switching off first and second injection operations respectively for said first and second mass only as said pin moves into said second positions.

* * * * *